United States Patent
Jafari Tafti et al.

(10) Patent No.: US 10,203,698 B1
(45) Date of Patent: Feb. 12, 2019

(54) SYSTEM AND METHOD FOR PROVIDING A MAP TO AUTONOMOUS VEHICLES VIA A CLOUD-BASED SYSTEM

(71) Applicant: GM GLOBAL TECHNOLOGY OPERATIONS LLC, Detroit, MI (US)

(72) Inventors: Sayyed Rouhollah Jafari Tafti, Troy, MI (US); Soheil Samii, Troy, MI (US); Fan Bai, Ann Arbor, MI (US); Michael A. Losh, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/673,855

(22) Filed: Aug. 10, 2017

(51) Int. Cl.
| | |
|---|---|
| G05D 1/00 | (2006.01) |
| G05D 1/02 | (2006.01) |
| G01C 21/26 | (2006.01) |
| G06F 17/30 | (2006.01) |
| H04L 29/08 | (2006.01) |

(52) U.S. Cl.
CPC ........... *G05D 1/0276* (2013.01); *G01C 21/26* (2013.01); *G06F 17/30241* (2013.01); *G06F 17/30864* (2013.01); *H04L 67/1097* (2013.01); *G05D 1/0088* (2013.01)

(58) Field of Classification Search
CPC .... G05D 1/0276; G05D 1/0088; G01C 21/26; G06F 17/30241; G06F 17/30864; H04L 67/1097
USPC .......................................................... 701/23
See application file for complete search history.

(56) References Cited

U.S. PATENT DOCUMENTS

| | | | |
|---|---|---|---|
| 8,711,181 B1* | 4/2014 | Nourse | G06F 3/14 345/660 |
| 2011/0118972 A1* | 5/2011 | Boschker | G01C 21/3476 701/532 |
| 2013/0147846 A1* | 6/2013 | Kalai | G06T 1/60 345/660 |
| 2017/0192436 A1* | 7/2017 | Min | G05D 1/0276 |

* cited by examiner

*Primary Examiner* — Marthe Y Marc-Coleman
(74) *Attorney, Agent, or Firm* — Cantor Colburn LLP

(57) ABSTRACT

A system and method for providing a map via a cloud-based system is disclosed. The method includes requesting, by a controller of an autonomous vehicle, a map data from a cloud-based server. The map data is stored on the cloud-based server. The method also includes receiving map data from the cloud-based server. The method also includes autonomously navigating the autonomous vehicle based on the received map data.

17 Claims, 6 Drawing Sheets

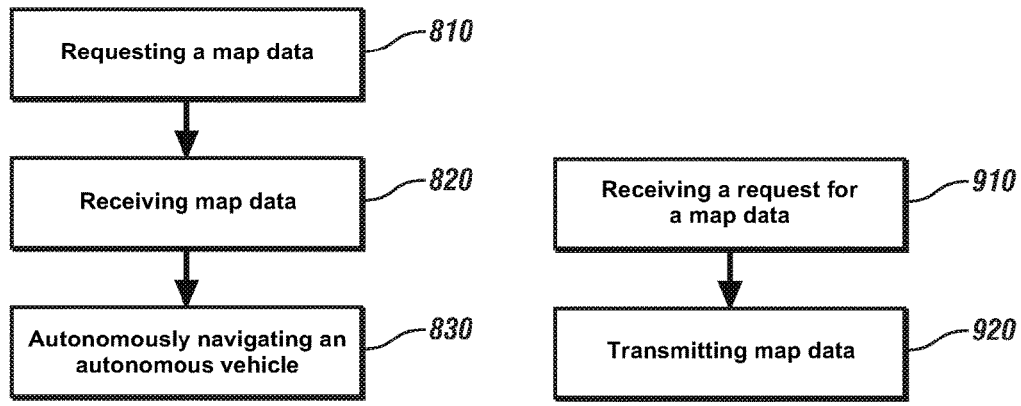
FIG. 8
FIG. 9
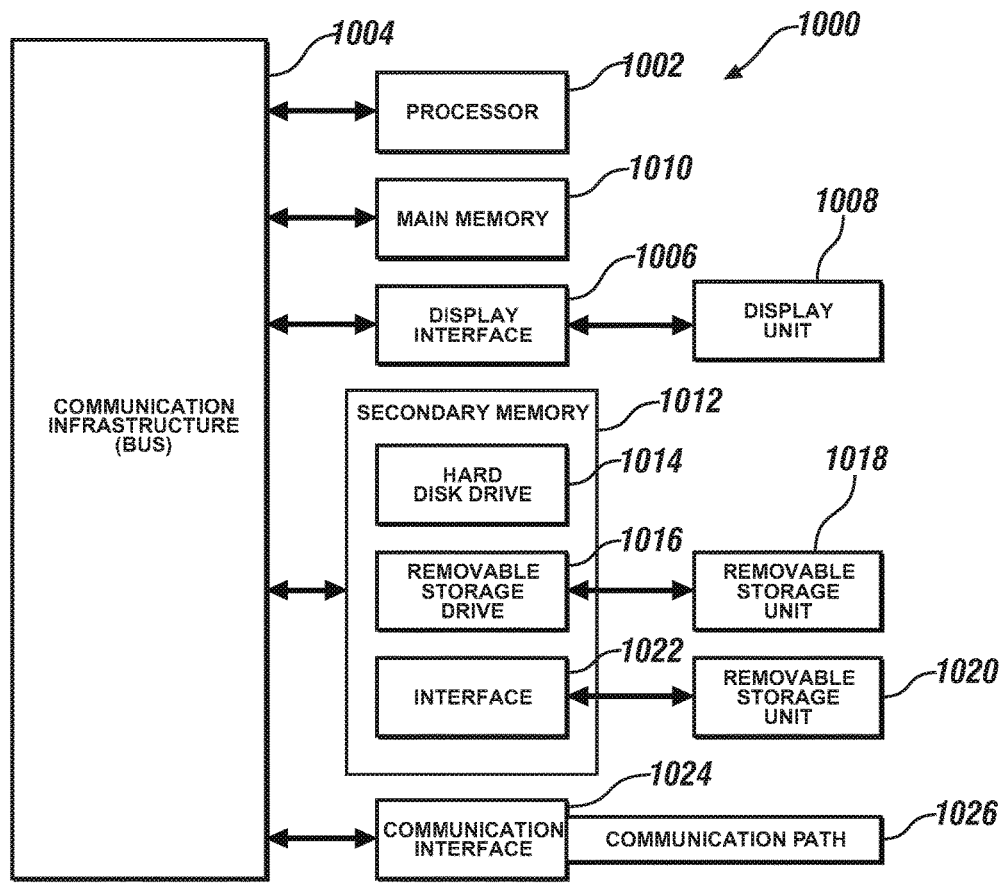
FIG. 10

SYSTEM AND METHOD FOR PROVIDING A MAP TO AUTONOMOUS VEHICLES VIA A CLOUD-BASED SYSTEM

INTRODUCTION

The subject embodiments relate to providing a map to autonomous vehicles via a cloud-based system. Specifically, one or more embodiments provide a map to autonomous vehicles via a cloud-based system to enable autonomous navigation, for example.

An autonomous vehicle is a vehicle that is capable of navigating on a road without input by a human driver. Autonomous vehicles are able to navigate on the road by detecting/sensing characteristics of a driving environment. Autonomous vehicles can detect/sense characteristics of the driving environment using, for example, global positioning technologies, radar technologies, laser technologies, and computer vision technologies, for example.

SUMMARY

In one exemplary embodiment, a method includes requesting, by a controller of an autonomous vehicle, a map data from a cloud-based server. The map data is stored on the cloud-based server. The method can also include receiving map data from the cloud-based server. The method can also include autonomously navigating the autonomous vehicle based on the received map data.

In another exemplary embodiment, the received map data includes a plurality of levels of map data. Each level of map data corresponds to a different level of detail regarding the driving environment, and each level of map data corresponds to a different duration of temporal validity.

In another exemplary embodiment, the requesting includes adaptively determining at least one level of map data to pre-fetch. The determining is based on whether a connectivity problem is predicted to exist, and the autonomous vehicle pre-fetches a less-detailed level of map data if a connectivity problem exists.

In another exemplary embodiment, the autonomously navigating the autonomous vehicle includes adaptively modifying an operating mode of the autonomous vehicle based on whether a connectivity problem exists. The autonomous vehicle is operated in accordance with a mode that is supported using a less-detailed level of map data if a connectivity problem exists.

In another exemplary embodiment, the method also includes dynamically joining a multicast group based at least on a location of the autonomous vehicle. The received map data is based on the joined multicast group.

In another exemplary embodiment, the method also includes receiving a multicast group index information upon joining the multicast group.

In another exemplary embodiment, the multicast group index information includes a plurality of multicast group addresses and characteristics of map data.

In another exemplary embodiment, a system within an autonomous vehicle includes an electronic controller configured to request a map data from a cloud-based server. The map data is stored on the cloud-based server. The electronic controller is also configured to receive map data from the cloud-based server. The electronic controller is also configured to autonomously navigate the autonomous vehicle based on the received map data.

In another exemplary embodiment, the received map data includes a plurality of levels of map data, each level of map data corresponds to a different level of detail regarding the driving environment, and each level of map data corresponds to a different duration of temporal validity.

In another exemplary embodiment, the requesting includes adaptively determining at least one level of map data to pre-fetch. The determining is based on whether a connectivity problem is predicted to exist, and the autonomous vehicle pre-fetches a less-detailed level of map data if a connectivity problem exists.

In another exemplary embodiment, the autonomously navigating the autonomous vehicle includes adaptively modifying an operating mode of the autonomous vehicle based on whether a connectivity problem exists, and the autonomous vehicle is operated in accordance with a mode that is supported using a less-detailed level of map data if a connectivity problem exists.

In another exemplary embodiment, the electronic controller is further configured to dynamically join a multicast group based at least on a location of the autonomous vehicle. The received map data is based on the joined multicast group.

In another exemplary embodiment, the electronic controller is also configured to receive a multicast group index information upon joining the multicast group.

In another exemplary embodiment, the multicast group index information includes a plurality of multicast group addresses and characteristics of map data.

In another exemplary embodiment, a method includes receiving, by an electronic controller of a cloud-based system, a request for a map data from an autonomous vehicle. The map data is stored on the cloud-based system. The method also includes transmitting map data to the autonomous vehicle.

In another exemplary embodiment, the transmitted map data includes a plurality of levels of map data. Each level of map data corresponds to a different level of detail regarding the driving environment, and each level of map data corresponds to a different duration of temporal validity.

In another exemplary embodiment, the request for the map data includes a determined request for at least one level of map data to be adaptively pre-fetched. The determination of the request is based on whether a connectivity problem is predicted to exist. The autonomous vehicle pre-fetches a less-detailed level of map data if a connectivity problem exists.

In another exemplary embodiment, the transmitted map data is used to autonomously navigate the autonomous vehicle. The autonomous navigation includes adaptively modifying an operating mode of the autonomous vehicle based on whether a connectivity problem exists, and the autonomous vehicle is operated in accordance with a mode that is supported using a less-detailed level of map data if a connectivity problem exists.

In another exemplary embodiment, the cloud-based system implements at least one multicast group. The autonomous vehicle dynamically joins the at least one multicast group based at least on a location of the autonomous vehicle, and the transmitted map data is based on the joined multicast group.

In another exemplary embodiment, the method also includes transmitting a multicast group index information to the autonomous vehicle when the autonomous vehicle joins the multicast group.

In another exemplary embodiment, a system within a cloud-based system includes an electronic controller configured to receive a request for a map data from an autonomous vehicle. The map data is stored on the cloud-based system. The electronic controller is also configured to transmit map data to the autonomous vehicle.

In another exemplary embodiment, the transmitted map data includes a plurality of levels of map data, each level of map data corresponds to a different level of detail regarding the driving environment, and each level of map data corresponds to a different duration of temporal validity.

In another exemplary embodiment, the request for the map data includes a determined request for at least one level of map data to be adaptively pre-fetched, the determination of the request is based on whether a connectivity problem is predicted to exist, and the autonomous vehicle pre-fetches a less-detailed level of map data if a connectivity problem exists.

In another exemplary embodiment, the transmitted map data is used to autonomously navigate the autonomous vehicle. The autonomous navigation includes adaptively modifying an operating mode of the autonomous vehicle based on whether a connectivity problem exists, and the autonomous vehicle is operated in accordance with a mode that is supported using a less-detailed level of map data if a connectivity problem exists.

In another exemplary embodiment, the cloud-based system implements at least one multicast group, and the autonomous vehicle dynamically joins the at least one multicast group based at least on a location of the autonomous vehicle. The transmitted map data is based on the joined multicast group.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 8 depicts a flowchart of another method in accordance with one or more embodiments;

FIG. 9 depicts a flowchart of another method in accordance with one or more embodiments; and FIG. 10 depicts a high-level block diagram of a computing system, which can be used to implement one or more embodiments.

DETAILED DESCRIPTION

Figure 1:
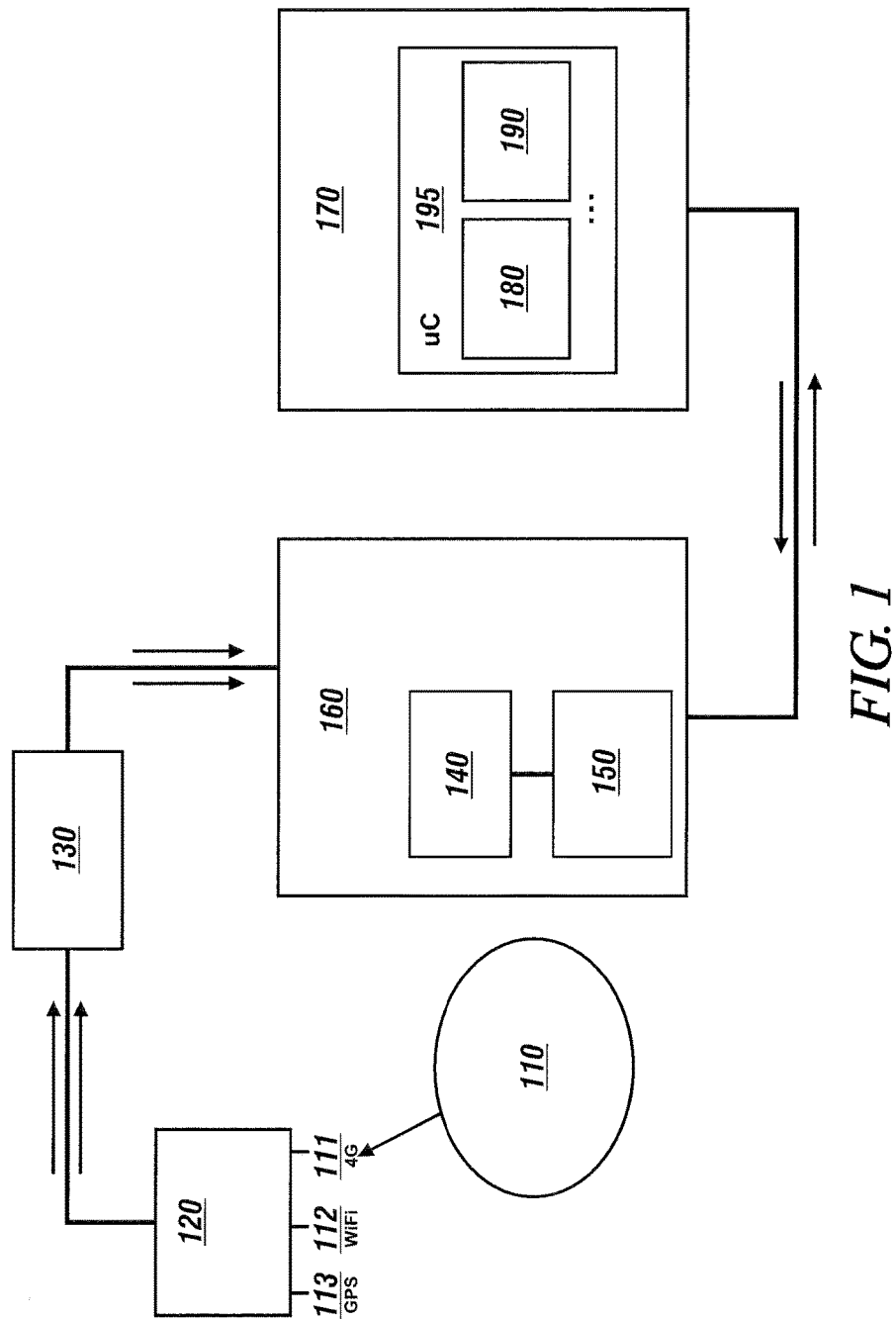
FIG. 1 illustrates an example system that provides maps for performing autonomous navigation in accordance with the current approaches.

The following description is merely exemplary in nature and is not intended to limit the present disclosure, its application or uses. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The current approaches that enable autonomous driving capability generally use data within high-definition maps. By using the data within these maps, the current approaches are able to operate autonomous vehicles in a continuous and safe manner. The current approaches typically store these high-definition maps within an electronic control unit (ECU) in each autonomous vehicle. With the current approaches, an autonomous vehicle typically extracts relevant map tiles from within its ECU in order to generate and update paths/trajectories while the autonomous vehicle is navigating on the road. Map tiles generally correspond to portions of larger map data. Based on the generated and updated paths/trajectories, the autonomous vehicles can generate actuator commands to perform the necessary braking, steering, and propulsion.

As time passes, the high-definition maps generally need to be updated/changed in order to accurately reflect the driving environments. One type of change that can be applied to high-definition maps can be referred to as a persistent change. Persistent changes are changes that are long-lasting. Persistent changes can correspond to changes in topology and road geometry, for example. Another type of change that can be applied to one or more high-definition maps can be referred to as a transient change. Transient changes can be changes that are temporary in nature. Transient changes can correspond to changes in the driving environment due to accidents, new construction events, and/or road closure events, for example.

However, the current approaches can encounter difficulties when updating/changing the stored high-definition map data because such high-definition map data is stored within each individual autonomous vehicle. As such, in order for the current approaches to update the stored high-definition map data, the current approaches need to implement coordination between the Original-Equipment Manufacturer (OEM) of the vehicles, the map supplier, and the backend servers. In order for the current approaches to update the stored high-definition map data, the current approaches need to coordinate between numerous vehicles that are on the road around the world.

In view of the above-described difficulties associated with the current approaches, one or more embodiments provide an improved system for storing, updating, and communicating map data. With one or more embodiments, the map data is stored on a cloud-based system, and the map data is provided by the cloud-based system to the autonomous vehicles.

By storing the map data in a centralized cloud-based system (as opposed to storing the map data within each autonomous vehicle), one or more embodiments can update the map data that is stored in the centralized cloud-based system without needing to update map data that is stored across numerous autonomous vehicles. As such, by storing the map data in a centralized cloud-based system, one or more embodiments reduce or eliminate the difficulties associated with coordinating vehicles to receive map data updates. Another advantage of using a cloud-based system is that the need for embedded storage and processing within the vehicle can be eliminated (or significantly reduced), which can result in more efficient use of embedded hardware resources.

FIG. 1 illustrates an example system that provides maps for performing autonomous navigation in accordance with the current approaches. The example of FIG. 1 includes a back office cloud/server 110 that communicates with a telematics module 120 of an autonomous vehicle. In addition to telematics module 120, the autonomous vehicle also includes a gateway module 130, a map module 160, and an autonomous control module 170. Autonomous control module 170 can include a controller 195 and/or control processing units 180. Back office cloud/server 110 can communicate with telematics module 120 to transmit/receive network communication such as 4G communication 111, WiFi communication 112, and/or global positioning system information 113, for example. In general, the communication can be performed using any current or future wireless communication technology.

As illustrated in FIG. 1, the autonomous vehicle can also include memory components that store high-definition map data and can also include processing components that process the high-definition map data. For example, the autonomous vehicle can store high-definition map data within non-volatile memory 140 and/or a Random Access Memory (RAM) 190. The autonomous vehicle can also include a controller 150 for processing the high-definition map data and for controlling the memory components. The processing of map data is typically based on map data buffered in RAM 190. This data is typically pre-fetched from the NVM storage 140 based on the position of the vehicle. Because these NVM memory components are implemented within the autonomous vehicles themselves, any necessary changes/updates to the map data need to be propagated to all autonomous vehicles. As such, as described above, the current approaches encounter difficulties when updating/changing the stored high-definition map data because the current approaches need to coordinate between potentially millions of vehicles that are on the road.

As described above, one or more embodiments provide an improved system for storing, updating, and communicating map data. With one or more embodiments, the map data is stored on a cloud-based system, and the map data is provided by the cloud-based system to autonomous vehicles.

Further, because map data is stored within a centralized cloud-based system, one or more embodiments can perform route planning more efficiently because the stored map data can include the latest updates. For example, the stored map data of one or more embodiments can include information from additional information sources that have become recently available. For example, additional information can become available when the government publishes map changes resulting from construction zones, where the map changes are published in a standardized data format that can be processed by one or more embodiments.

In addition to the features described above, one or more embodiments can also mitigate/mask the effects associated with a temporary connectivity failure between the cloud-based system and the autonomous vehicles. The effects associated with the connectivity failure can be mitigated/masked by performing a multi-layered pre-fetch method of map tiles, as described in more detail below. One or more embodiments can also perform a method to mitigate the effects of a loss of connectivity between the cloud-based system and the autonomous vehicles in the event that the loss of connectivity lasts for a lengthy duration, as described in more detail below. Connectivity problems can include problems relating to latency, availability, and/or other system failures.

One or more embodiments can be configured to perform the method of tiered, multi-layered, and adaptive pre-fetch of map tiles using multicast groups based on a geography, a level of detail/resolution, and/or time windows. One or more embodiments can implement more efficient network utilization based on multicast tiered groups, as described in more detail below.

One or more embodiments can also implement a learning algorithm that determines which map tiles are frequently fetched and stored persistently within non-volatile memory.

Figure 2:
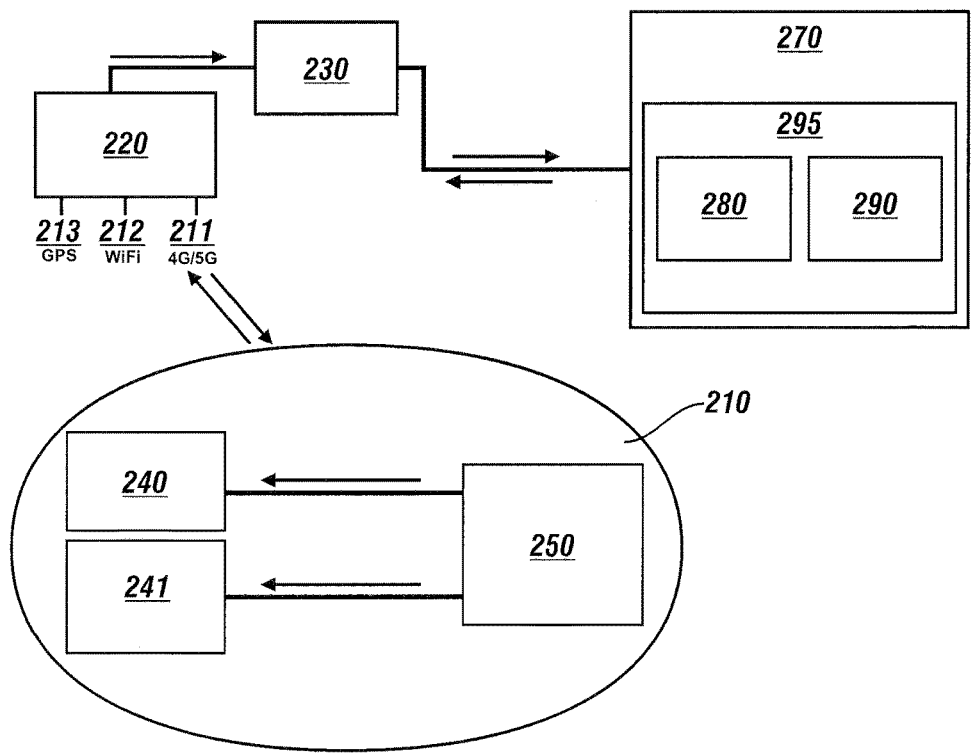
FIG. 2 illustrates an example system of a cloud-based runtime map provider of one or more embodiments.

FIG. 2 illustrates an example system of a cloud-based runtime map provider of one or more embodiments. Similar to the example of FIG. 1, the example of FIG. 2 includes a back office cloud/server 210 that connects to an autonomous vehicle. The autonomous vehicle can include a telematics module 220, a gateway module 230, and an autonomous control module 270. Back office cloud/server 210 can communicate with telematics module 220 to transmit/receive network communication such as 4G/5G communication 211, WiFi communication 212, and/or global positioning system information 213, for example. These modules are merely example modules. One or more embodiments can include more modules or less modules than the above-described modules. The method of one or more embodiments can be performed using different in-vehicle systems and/or network architectures. However, unlike the example of FIG. 1, the back office cloud/server 210 of FIG. 2 implements the memory components and the processing components that store/process the high-definition maps. For example, back office cloud/server 210 includes a non-volatile memory 240, a RAM 241, and a controller 250. A controller 295 of the autonomous vehicle can also include one or more computer processing units 280 and a RAM 290 for storing buffered map tiles.

Because the memory components and the processing components are included within the back office cloud/server 210, one or more embodiments can implement changes to the map data without the need to propagate all the changes to all of the autonomous vehicles on the road around the world, as described above.

Figure 3:
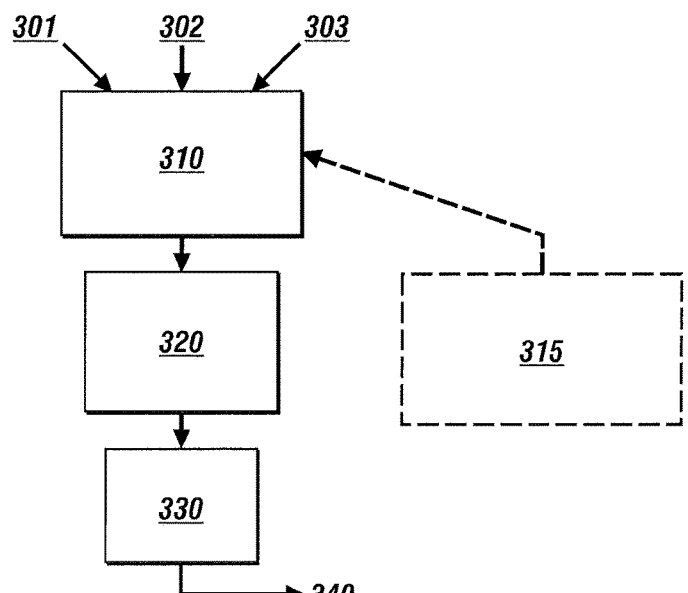
FIG. 3 illustrates the functions of an example map provider module, in accordance with one or more embodiments.

FIG. 3 illustrates the functions of an example map provider module, in accordance with one or more embodiments. The map provider module can be implemented by electronic control unit 250 of FIG. 2, for example. The map provider module can be configured to perform steps 310-330 of FIG. 3. At 310, the map provider module can be configured to receive inputs including a vehicle state 301, a map data and/or route plan request 302, and/or a maximum buffer size 303. These inputs can be transmitted to the map provider module from an autonomous vehicle, for example. Using the received inputs, the map provider module can be configured to extract one or more relevant map tiles in response to the request and can plan a new route for the autonomous vehicle. The map provider module can extract the relevant map tiles from non-volatile memory and/or a temporary map memory. At 315, the size of the extracted map tile can be determined based on a nominal driving speed, an estimated communication latency, and/or an amount of server traffic. For example, with one or more embodiments, the geographical area that corresponds to an extracted map tile can be larger if the nominal driving speed is a higher speed. The geographical area of the extracted map tile can be larger if the estimated communication latency is determined to be high. The size of the geographical area of the map tile can be larger if the estimated communication latency is estimated to be a longer duration.

At 320, the map provider module can be configured to filter the map data based on the planned route and the vehicle state. At 330, the map provider module can be configured to communicate the filtered map data to the requesting autonomous vehicle. The communication to the requesting vehicle can occur via wireless communication such as, for example, 4G or 5G communication at 340.

Figure 4:
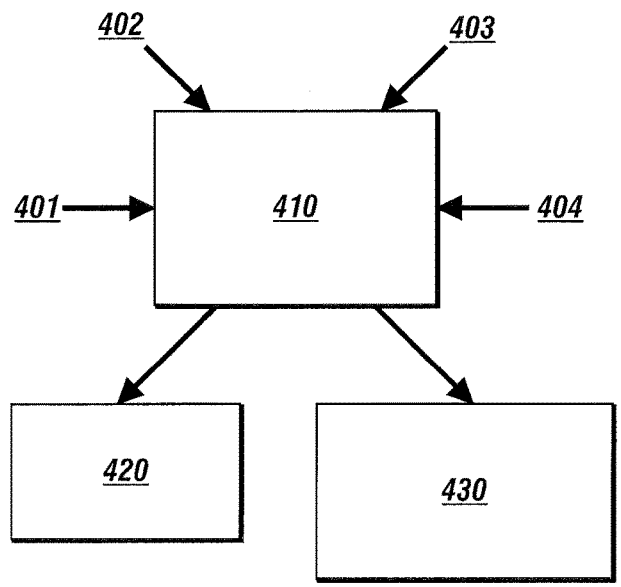
FIG. 4 illustrates an example map update module, in accordance with one or more embodiments.

FIG. 4 illustrates an example map update module, in accordance with one or more embodiments. The map update module of FIG. 4 can also be implemented by electronic control unit 250 of FIG. 2, for example. The map update module of FIG. 4 can be configured to implement the functions illustrated in FIG. 4. At 410, the map update module can be configured to receive permanent map updates 401 (from a supplier of map updates, for example). The map update module can also be configured to receive final and intermediate destinations 402 that are published/reported by each vehicle. The map update module can also be configured to receive changes in map data that have been sensed by vehicles 403. As such, if vehicles have determined that changes in the map data are necessary, the vehicles can communicate such changes to the map update module 410. The map update module can also be configured to receive information relating to runtime changes 404 from traffic reports of active routes. The traffic reports can be related to accidents and/or road closures, for example. As such, in view of the received inputs, at 410, the map update module can be configured to update the stored map data. At 420, the map update module can be configured to store certain long-lasting changes (such as persistent change, for example) in non-volatile memory. At 430, the map update module can also be configured to update map data that is stored in a temporary storage (i.e., a RAM storage, for example). The updates stored in the temporary storage can include transient changes, for example. Such updating of the temporary storage can include deleting of maps based on whether the vehicles that have used the maps have completed their corresponding trips.

Figure 5:
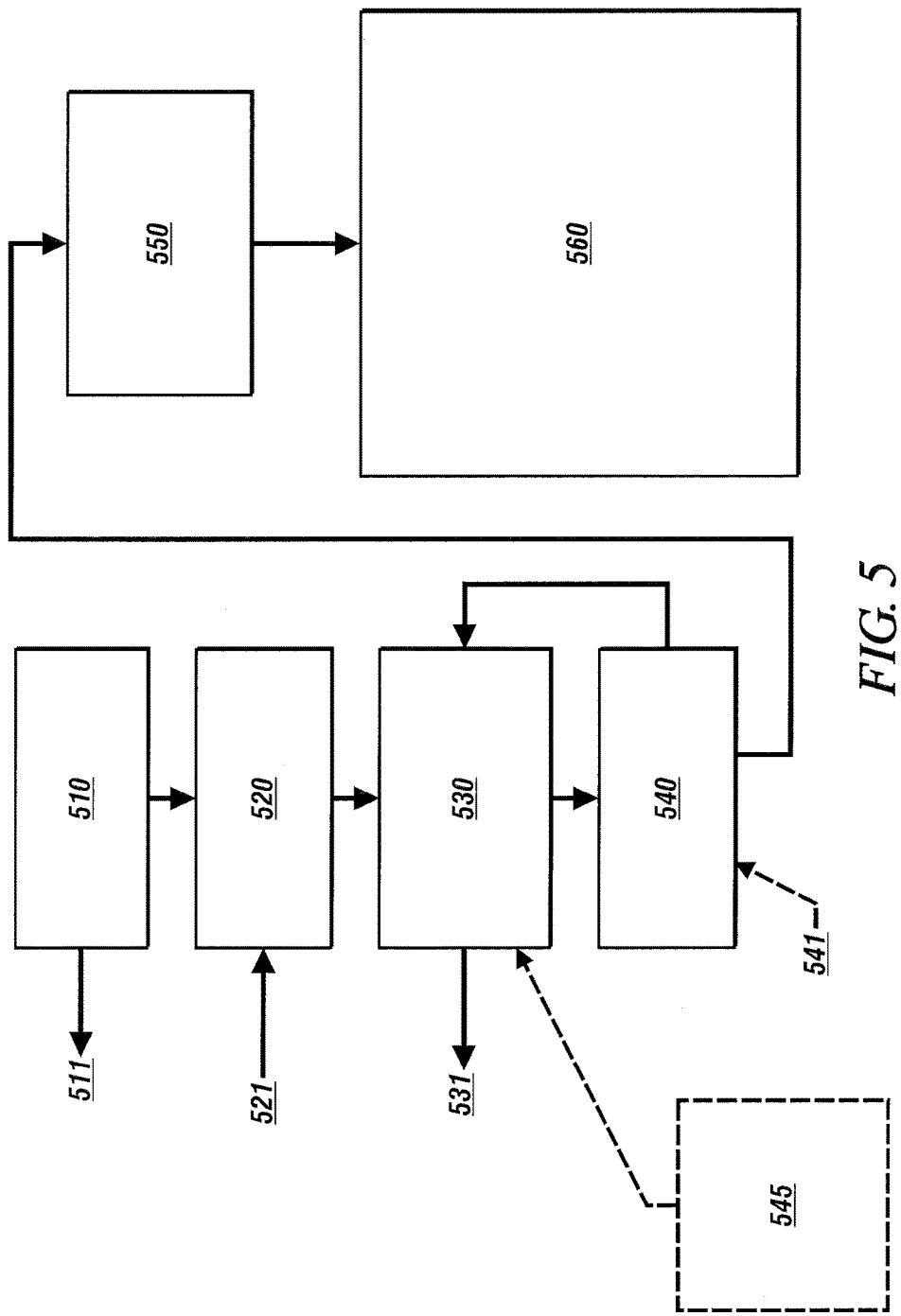
FIG. 5 depicts a flowchart of a method in accordance with one or more embodiments.

FIG. 5 depicts a flowchart of a method in accordance with one or more embodiments. The example method of FIG. 5 can be performed by an autonomous vehicle, for example. At 510, at the start of autonomous navigation, the autonomous vehicle can request a route to a destination and can request a corresponding map data. The autonomous vehicle can transmit the request 511 for the map data and the route plan to the cloud-based system. As a result of the request 511, new map tiles 521 can be received by the autonomous vehicle from the cloud-based system. At 520, the autonomous vehicle can be configured to enable planning software modules once the map data is received (i.e., once the new map tiles are received from the cloud-based system). The planning modules will begin using the map tiles to plan maneuvers and driving behaviors. Specifically, the planning modules are the software components that receive map and sensory data as inputs and that generate a desired trajectory to be followed by the vehicle as an output. As the autonomous vehicle navigates using the received map tiles, the autonomous vehicle will eventually need to receive additional map tiles as the autonomous vehicle approaches geographical areas that are not reflected within the map tiles that have already been received. The previously-received map tiles that are still applicable to the current navigation can generally be referred to as "relevant tiles." The relevant tiles can be tiles which contain data relating to the driving environment that is still useful to the autonomous vehicle in navigating the road. Therefore, when the amount of applicable data contained by the relevant tile(s) falls beneath a threshold amount, one or more embodiments can be configured to initiate a request for additional map tiles. For example, at 530, when reaching a threshold "X" amount of applicable data (within the relevant map tiles) remaining in the stored memory of the autonomous vehicle, the autonomous vehicle can request new map tiles from the cloud-based system. "X" can also correspond to a threshold duration of time before all the remaining applicable data is used by the autonomous vehicle based on the planned route. At 531, the autonomous vehicle can transmit a request for map data to the cloud. At 545, the threshold amount "X" can be determined based on a nominal driving speed of the autonomous vehicle and can be based on an estimated communication latency between the autonomous vehicle and the cloud-based system. With one or more embodiments, a faster nominal driving speed will result in a larger determined threshold amount "X." With one or more embodiments, a longer estimated communication latency will also result in a larger determined threshold amount "X."

At 540, when new map tiles 541 are received from the cloud-based system, the autonomous vehicle can store the tiles in memory such as, for example, within a buffer of Random Access Memory (RAM) for running planning modules. At 550, if insufficient new map tiles are received from the cloud-based system, and the amount of applicable data within relevant map tiles ("Y") that remain in the autonomous vehicle's memory is less than "X," then the autonomous vehicle can be configured to initiate a mitigation strategy.

At 560, the autonomous vehicle can be configured to execute a mitigation strategy. With one example mitigation strategy, the autonomous system can prompt the driver to take control over the vehicle. Alternatively, the autonomous system can be configured to gradually reduce the speed of the vehicle in order to extend the amount of time that the stored relevant map tiles remain relevant. With one or more embodiments, if no human driver assumes control over the vehicle, then the autonomous system can be configured to navigate the vehicle to achieve a minimal risk condition. For example, the autonomous system can control the vehicle to stop at a shoulder of a road or to drive the vehicle to a side road, for example. With one or more embodiments, the minimal risk condition can be determined based on the map tiles that are stored in the memory/buffer of the autonomous vehicle. Alternatively, the minimal risk condition can be determined by the cloud-based system. In one or more embodiments, the cloud-based system can periodically transmit one or more parameters relating to the minimal risk condition to the autonomous vehicle.

With one or more embodiments, the autonomous vehicle can request/receive different types of map data. Each different type of map data can be of a different level of richness/detail. With one or more embodiments, the types of map data can be "level 0," "level 1," "level 2," and/or "level 3" map data, for example. In one embodiment, "level 0" map data can correspond to map data that includes a lowest level of driving environment richness/detail. "Level 1" and "level 2" map data can correspond to map data that includes a medium level of richness/detail. "Level 3" map data can correspond to map data that includes a highest level of richness/detail.

In one example embodiment, layer 3 map data can include the highest level/amount of detail which includes topology data, road geometry data, lane level details, and road sign data, for example. Layer 2 map data can also include topology data, road geometry data, lane level details, and road sign data. However, layer 2 map data can include less detail than layer 3 map data. Layer 1 map data can also include topology data, lane level details, and road sign data. Layer 0 map data can include road sign data.

With one or more embodiments, an autonomous vehicle can operate in accordance with a plurality of operating modes. Each advancing mode of operation of the autonomous vehicle can represent an advancing level of complexity of autonomous operation by the vehicle. With one or more embodiments, the modes of operation that are available for use by an autonomous vehicle at a given time can be based on the type of map data (i.e., level 0, level 1, level 2, level 3) that is available to the autonomous vehicle at that time.

An autonomous vehicle can autonomously operate in an advanced mode (and thus perform operations of greater complexity) if the autonomous vehicle has received sufficient detailed map data to support the advanced mode. With one or more embodiments, as the complexity of autonomous operations increases, the necessary level of detail of the map data (for supporting the autonomous operations) also increases.

For example, when operating an autonomous vehicle in accordance with a "level 4" mode (an advanced operating mode) and when using "layer 3" data (a map data with high detail), one or more embodiments can perform autonomous driving with automatic lane changes and turns, and can perform automatic control to achieve a minimal risk condition, if needed.

When operating the autonomous vehicle in accordance with a "level 3" mode (a medium operating mode) and when using "layer 2" data (a map data with medium detail), one or more embodiments can perform automatic lane changes and turns.

When operating the autonomous vehicle in accordance with a "level 3" mode (a medium operating mode) and when using "layer 1" data (a map data with lower detail), one or more embodiments can perform automatic lane changes but cannot perform turns.

When operating the autonomous vehicle in accordance with a "level 3" mode (a medium operating mode) and when using "layer 0" data (a map data with a lowest amount of environmental detail), one or more embodiments can perform autonomous driving that is constrained to a given lane (without being able to perform any lane changes).

Therefore, as described above, an autonomous vehicle can autonomously perform operations of greater complexity if the autonomous vehicle has received detailed map data. If the autonomous vehicle has received map data of low detail, then the autonomous vehicle can be limited to autonomously performing operations of lower complexity. With one or more embodiments, as the complexity of autonomous operations increases, the necessary level of detail of the map data (for supporting the autonomous operations) also increases.

One or more embodiments can adaptively modify an operating mode of the autonomous vehicle based on whether a connectivity problem exists. Specifically, if a connectivity problem is determined to exist between the autonomous vehicle and the cloud-based system, the autonomous vehicle can be configured to modify the operating mode to use a less-detailed level of the pre-fetched/stored map data in order to mitigate the effects of a loss of connectivity with the cloud-based system, for example. This less-detailed level of map data provides enough information for the autonomous vehicle to operate for a longer duration (but at a reduced capability). Because the autonomous vehicle can operate for a longer duration, one or more embodiments can mask short-duration connectivity problems and can give more time to the system (or to a human driver) to react (e.g., to navigate to the side of the road or to take over steering control).

Figure 6:
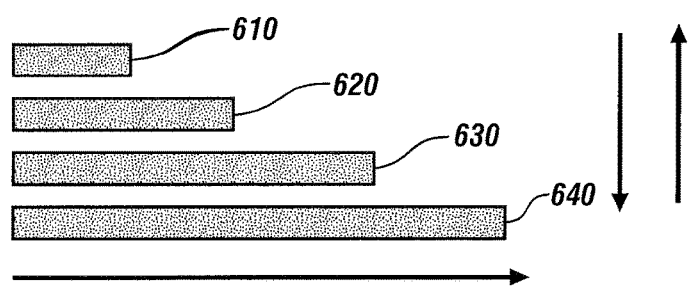
FIG. 6 illustrates a method for performing a tiered pre-fetch of map data in accordance with one or more embodiments.

FIG. 6 illustrates a method for performing a tiered pre-fetch of map data in accordance with one or more embodiments. With one or more embodiments, an autonomous vehicle can periodically perform a tiered pre-fetch of map data. The method of fetching/receiving map data can be considered to be a "pre-fetch" method because the autonomous vehicle is configured to request the map data prior to when the requested map data is needed for supporting autonomous navigation. The method of fetching/receiving map data can be considered to be a "tiered" method because the autonomous vehicle can be configured to receive one or more different types/layers of map data at the same time. For example, one or more embodiments can be configured to fetch one or more types of map data (i.e., layer 0, layer 1, layer 2, and/or layer 3) at a given time from the cloud-based system.

Referring to FIG. 6, in addition to reflecting different levels of environmental detail, each type of map data (i.e., layer 0, layer 1, layer 2, and/or layer 3) can correspond to a different duration of temporal validity. A duration of temporal validity for a given map data generally refers to a length of time that the map data is relevant/useful for supporting autonomous navigation.

In general, the duration of temporal validity of a type of map data can be inversely related to the amount of detail of the type of map data. The inverse relationship can exist because, for a given amount of data, there can be a tradeoff between the amount environmental detail that can be included in the data and the size of the geographical area that the given amount of data pertains to.

For example, for a given amount of data, if the data contains a high amount of detail, then the given amount of data can only pertain to a relatively small geographical area with high detail. On the other hand, if the data contains a sparse amount of detail, then the given amount of data can be directed to/pertain to a relatively larger geographical area.

Therefore, for a given amount of layer 3 data 610, this data contains a high amount of detail regarding a relatively small geographical area. As such, because the autonomous vehicle (at a given speed) is likely to travel through and away from the small geographical area relatively quickly, the layer 3 data 610 will be relevant/useful for supporting autonomous navigation for a relatively short amount of time (i.e., 2 minutes).

On the other hand, for the same amount of data, layer 0 data 640 can contain a low amount of detail regarding a relatively large geographical area. As such, because the autonomous vehicle (at the same given speed) is likely to spend more time within the large geographical area, the layer 0 data 640 can be relevant/useful for supporting autonomous navigation for a relatively longer amount of time (20 minutes).

Layer 2 data 620 can contain a lower amount of detail than layer 3 while being relevant/useful for supporting autonomous navigation for a medium length of time (5 minutes). Layer 1 data 630 can contain a lower amount of detail than layer 2 while being relevant/useful for supporting autonomous navigation for a longer period of time (10 minutes).

In view of the different types of map data and the different corresponding temporal validities of each different type of map data, one or more embodiments can be configured to determine which layer or layers of map data to fetch. One or more embodiments can implement an adaptive method of prefetching map data. One or more embodiments can adaptively determine which layers of map data are to be fetched from the cloud-based system. The determination can be based on predicted future cloud connectivity properties. For example, if the autonomous vehicle predicts that connectivity problems will exist soon, then the autonomous vehicle can begin adaptively fetching data that is less detailed because such data can last a longer period of time.

For example, if the autonomous vehicle predicts that connectivity problems will exist soon, then the autonomous vehicle can begin adaptively fetching layer 0 data, which is the least detailed data but which remains relevant for the longest period of time when the autonomous vehicle operates. As described above, the autonomous vehicle can also adaptively change the operating mode to use layer 0 data.

In view of the above, one or more embodiments can be configured to mitigate the effects of connectivity problems between autonomous vehicles and cloud-based systems. Depending on a type of connectivity problem and/or a duration of the connectivity problem, one or more embodiments can mitigate the effects of the connectivity problem by changing between the different types of layers of map data that are fetched. By adaptively switching from fetching detailed data to fetching less-detailed data, a connectivity problem can be tolerated for a longer length of time to allow time for the connectivity to return, to allow time for the autonomous vehicle to reach a minimal risk condition, or to allow time for the autonomous vehicle to prompt a driver to assume driving responsibilities. In view of the above-described tiered pre-fetch and adaptive tiered pre-fetch methods of receiving map data, one or more embodiments can enable autonomous driving systems to tolerate a connectivity problem that lasts for a short amount of time. One or more embodiments can be configured to adaptively modify a driving mode to reduce availability of autonomous operations in response to the connectivity problem.

Figure 7:
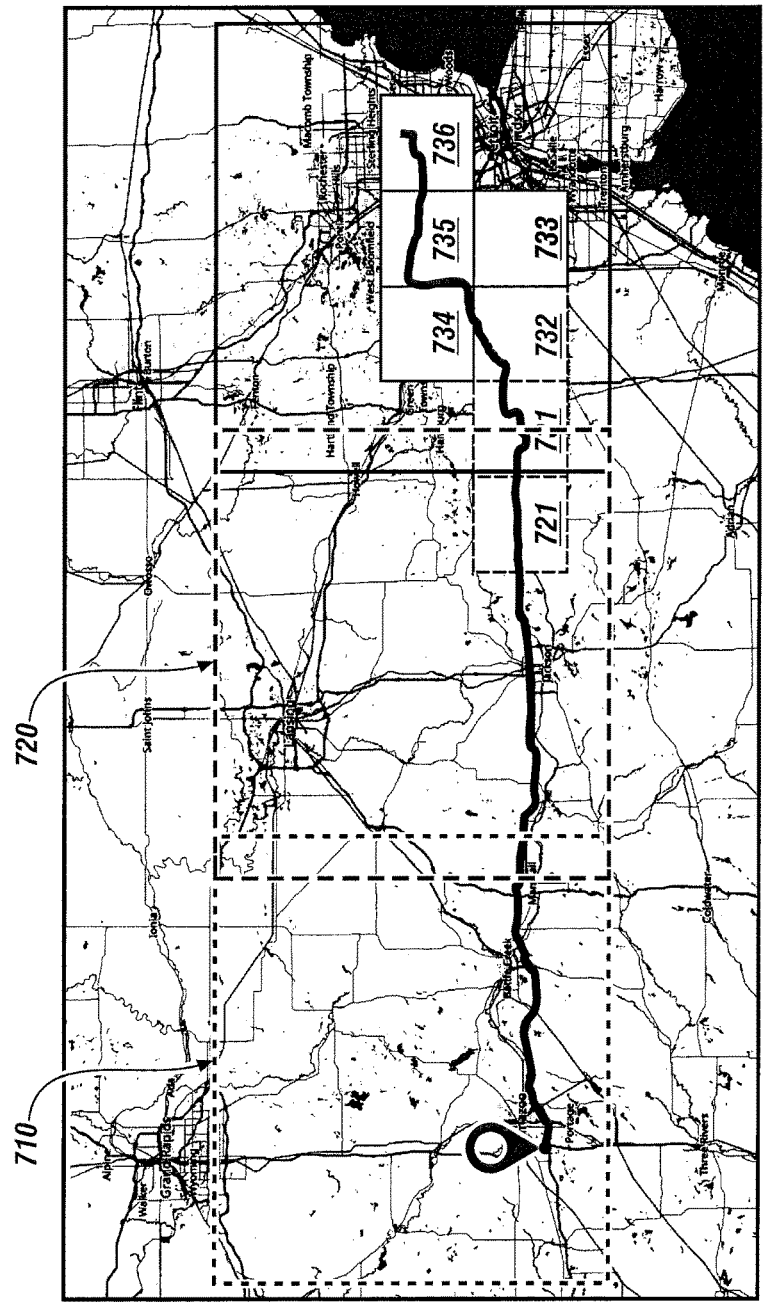
FIG. 7 illustrates implementing different multicast groups in accordance with one or more embodiments.

FIG. 7 illustrates implementing different multicast groups in accordance with one or more embodiments. With one or more embodiments, multicast groups can be organized by geographical area. One or more embodiments can implement different multicast groups, where a multicast group includes a group of autonomous vehicles. An autonomous vehicle can dynamically join and leave a multicast group based on a current location and a planned route of the vehicle.

Autonomous vehicle members of given multicast group can simultaneously receive transmissions from a cloud-based system. Because the vehicle members of the given group can receive the same or similar transmissions regarding a geographical area that the vehicle members are located within, one or more embodiments can reduce an amount of duplication of transmitted signals.

With one or more embodiments, the size of the geographical area that corresponds to each multicast group can be based on the amount of map detail that is necessary to be transmitted within that geographical area. In the example of FIG. 7, certain multicast groups (710 and 720) correspond to geographical areas that are open expanses of land. For example, geographical areas that have open expanses of land generally have less map detail to transmit. As such, multicast groups (710 and 720) that cover open expanses of land can generally cover larger geographical areas. However, geographical areas that correspond to urban areas are more compact and have more map details to transmit. As such, multicast groups that cover urban areas generally cover smaller geographical areas. In the example of FIG. 7, multicast groups (721, 731, 732, 733, 734, 735, and 736) correspond to geographical areas that are urban areas. With one or more embodiments, a multicast group can distribute index information about other multicast groups.

Referring to the example of FIG. 7, as an autonomous vehicle travels westward, the vehicle can leave one multicast group to join another multicast group. As such, the multicast group(s) that the vehicle has left can be considered to be groups of past membership, while the multicast group(s) that the vehicle is arriving into can be considered to be groups of future membership. One or more embodiments can include an index of multicast group addresses and the characteristics of the map data that each multicast group provides. If one or more embodiments need to receive map detail at a certain level (e.g., level 2 map data) within a certain geographic boundary, then the system can scan the index to determine which multicast group or groups will provide the specified map data. The multicast group(s) that can provide such map data can be uniquely identified by multicast group address(es).

The system of one or more embodiments can then use these addresses to join the relevant group(s) by using a multicast group membership protocol. As an autonomous vehicle joins and/or listens to a multicast group, any data that is sent to the group will be received by the autonomous vehicle. With one or more embodiments, an autonomous vehicle can simultaneously receive data from multiple group memberships. With one or more embodiments, the multicast group index information can itself be sent through a multicast group. As such, an autonomous vehicle can preliminarily join a first (i.e., a "root") multicast group in order to determine other groups that the autonomous vehicle needs to join and/or listen to.

FIG. 8 illustrates a flow chart of a method in accordance with one or more embodiments. At step 810, the method includes requesting, by a controller of an autonomous vehicle, a map data from a cloud-based server. The map data is stored on the cloud-based server. At step 820, the method also includes receiving map data from the cloud-based server. At step 830, the method also includes autonomously navigating the autonomous vehicle based on the received map data.

FIG. 9 depicts a flowchart of a method in accordance with one or more embodiments. The method can include, at block 910, receiving, by an electronic controller of a cloud-based system, a request for a map data from an autonomous vehicle. The map data is stored on the cloud-based system. The method can also include, at block 920, transmitting map data to the autonomous vehicle.

FIG. 10 depicts a high-level block diagram of a computing system 1000, which can be used to implement one or more embodiments. Computing system 1000 can correspond to, at least, an electronic controller of an autonomous vehicle, as described above, for example. Computing system 1000 can also correspond to, at least, an electronic controller of a cloud-based system, for example. Computing system 1000 can be used to implement hardware components of systems capable of performing methods described herein. Although one exemplary computing system 1000 is shown, computing system 1000 includes a communication path 1026, which connects computing system 1000 to additional systems (not depicted). Computing system 1000 and additional system are in communication via communication path 1026, e.g., to communicate data between them.

Computing system 1000 includes one or more processors, such as processor 1002. Processor 1002 is connected to a communication infrastructure 1004 (e.g., a communications bus, cross-over bar, or network). Computing system 1000 can include a display interface 1006 that forwards graphics, textual content, and other data from communication infrastructure 1004 (or from a frame buffer not shown) for display on a display unit 1008. Display unit 1008 can correspond to at least a portion of a dashboard of a vehicle, for example. Computing system 1000 also includes a main memory 1010, preferably random access memory (RAM), and can also include a secondary memory 1012. There also can be one or more disk drives 1014 contained within secondary memory 1012. Removable storage drive 1016 reads from and/or writes to a removable storage unit 1018. As will be appreciated, removable storage unit 1018 includes a computer-readable medium having stored therein computer software and/or data.

In alternative embodiments, secondary memory 1012 can include other similar means for allowing computer programs or other instructions to be loaded into the computing system. Such means can include, for example, a removable storage unit 1020 and an interface 1022.

In the present description, the terms "computer program medium," "computer usable medium," and "computer-readable medium" are used to refer to media such as main memory 1010 and secondary memory 1012, removable storage drive 1016, and a disk installed in disk drive 1014. Computer programs (also called computer control logic) are stored in main memory 1010 and/or secondary memory 1012. Computer programs also can be received via communications interface 1024. Such computer programs, when run, enable the computing system to perform the features discussed herein. In particular, the computer programs, when run, enable processor 1002 to perform the features of the computing system. Accordingly, such computer programs represent controllers of the computing system. Thus it can be seen from the forgoing detailed description that one or more embodiments provide technical benefits and advantages.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the embodiments not be limited to the particular embodiments disclosed, but will include all embodiments falling within the scope of the application.

What is claimed is:

1. A method, the method comprising:
   requesting, by a controller of an autonomous vehicle, a map data from a cloud-based server, wherein the map data is stored on the cloud-based server;
   receiving map data from the cloud-based server, the received map data comprising a plurality of levels of map data, each level of map data corresponding to a different level of detail regarding a driving environment and having a different duration of temporal utility for autonomous navigation based on the level of detail; and
   autonomously navigating the autonomous vehicle based on the received map data.

2. The method of claim 1, wherein the requesting comprises adaptively determining at least one level of map data to pre-fetch, the determining is based on whether a connectivity problem is predicted to exist, and the autonomous vehicle pre-fetches a less-detailed level of map data if a connectivity problem is predicted to exist.

3. The method of claim 1, wherein the autonomously navigating the autonomous vehicle comprises adaptively modifying an operating mode of the autonomous vehicle based on whether a connectivity problem exists, and the autonomous vehicle is operated in accordance with a mode that is supported using a less-detailed level of map data if a connectivity problem exists.

4. The method of claim 1, further comprising dynamically joining a multicast group based at least on a location of the autonomous vehicle, wherein vehicles that are members of the multicast group receive the same map data.

5. The method of claim 4, further comprising receiving a multicast group index information upon joining the multicast group.

6. The method of claim 5, wherein the multicast group index information comprises a plurality of multicast group addresses and characteristics of map data.

7. A system within an autonomous vehicle, comprising:
   an electronic controller configured to:
   request a map data from a cloud-based server, wherein the map data is stored on the cloud-based server;
   receive map data from the cloud-based server, the received map data comprising a plurality of levels of map data, each level of map data corresponding to a different level of detail regarding a driving environment and having a different duration of temporal utility for autonomous navigation based on the level of detail; and
   autonomously navigate the autonomous vehicle based on the received map data.

8. The system of claim 7, wherein the requesting comprises adaptively determining at least one level of map data to pre-fetch, the determining is based on whether a connectivity problem is predicted to exist, and the autonomous vehicle pre-fetches a less-detailed level of map data if a connectivity problem is predicted to exist.

9. The system of claim 7, wherein the autonomously navigating the autonomous vehicle comprises adaptively modifying an operating mode of the autonomous vehicle based on whether a connectivity problem exists, and the autonomous vehicle is operated in accordance with a mode that is supported using a less-detailed level of map data if a connectivity problem exists.

10. The system of claim 7, wherein the electronic controller is further configured to dynamically join a multicast group based at least on a location of the autonomous vehicle, wherein vehicles that are members of the multicast group receive the same map data.

11. The system of claim 10, wherein the electronic controller is further configured to receive a multicast group index information upon joining the multicast group.

12. The method of claim 11, wherein the multicast group index information comprises a plurality of multicast group addresses and characteristics of map data.

13. A method, the method comprising:
   receiving, by an electronic controller of a cloud-based system, a request for a map data from an autonomous vehicle, wherein the map data is stored on the cloud-based system; and
   transmitting map data to the autonomous vehicle, the received map data comprising a plurality of levels of map data, each level of map data corresponding to a different level of detail regarding a driving environment and having a different duration of temporal utility for autonomous navigation based on the level of detail.

14. The method of claim 13, wherein the request for the map data comprises a determined request for at least one level of map data to be adaptively pre-fetched, the determination of the request is based on whether a connectivity problem is predicted to exist, and the autonomous vehicle pre-fetches a less-detailed level of map data if a connectivity problem is predicted to exist.

15. The method of claim 13, wherein the transmitted map data is used to autonomously navigate the autonomous vehicle, the autonomous navigation comprises adaptively modifying an operating mode of the autonomous vehicle based on whether a connectivity problem exists, and the autonomous vehicle is operated in accordance with a mode that is supported using a less-detailed level of map data if a connectivity problem exists.

16. The method of claim 13, wherein the cloud-based system implements at least one multicast group, and the autonomous vehicle dynamically joins the at least one multicast group based at least on a location of the autonomous vehicle, and the vehicles that are members of the multicast group receive the same transmitted map data.

17. The method of claim 16, further comprising transmitting a multicast group index information to the autonomous vehicle when the autonomous vehicle joins the multicast group.

\* \* \* \* \*